United States Patent [19]

Elqadah et al.

[11] Patent Number: 5,575,498
[45] Date of Patent: Nov. 19, 1996

[54] AIRBAG MODULE COVER WITH FLOATING HORN SWITCH

[75] Inventors: Wael S. Elqadah; Mark L. Enders, both of North Ogden, Utah

[73] Assignee: Morton International, Inc., Chicago, Ill.

[21] Appl. No.: 507,585

[22] Filed: Jul. 26, 1995

[51] Int. Cl.⁶ .................................................. B60R 21/16
[52] U.S. Cl. .................... 280/731; 200/61.54; 280/728.3
[58] Field of Search .............................. 280/731, 728.3, 280/728.1; 200/61.54, 61.55

[56] References Cited

U.S. PATENT DOCUMENTS

| | | | |
|---|---|---|---|
| 5,062,661 | 11/1991 | Winget | 280/731 |
| 5,186,490 | 2/1993 | Adams et al. | 280/731 |
| 5,193,412 | 3/1993 | Hashiba | 200/61.54 |
| 5,239,147 | 8/1993 | Allard et al. | 200/61.54 |
| 5,283,404 | 2/1994 | Prescaro, Jr. | 200/61.54 |
| 5,331,124 | 7/1994 | Danielson | 200/61.54 |
| 5,369,232 | 11/1994 | Leonelli | 200/61.54 |
| 5,399,819 | 3/1995 | Lang et al. | 200/61.54 |
| 5,459,294 | 10/1995 | Danielson | 200/61.54 |
| 5,523,532 | 6/1996 | Leonelli et al. | 200/61.54 |

FOREIGN PATENT DOCUMENTS 4-5171  4/1992  Japan.

*Primary Examiner*—Eric D. Culbreth
*Attorney, Agent, or Firm*—George W. Rauchfuss, Jr.; Gerald K. White

[57] ABSTRACT

An airbag module cover having a floating membrane horn switch freely retained within a positive gap formed between the airbag module cover and a horn switch backing plate attached thereto. The switch backing plate is supported by a spacer substantially surrounding the horn switch to provide the positive gap, which accommodates the switch without sandwiching the switch between the cover and backing plate prior to actuation by the driver. Force concentrators extending from the cover towards the switch are also provided to reduce the amount of driver applied force necessary to actuate the horn switch.

20 Claims, 2 Drawing Sheets

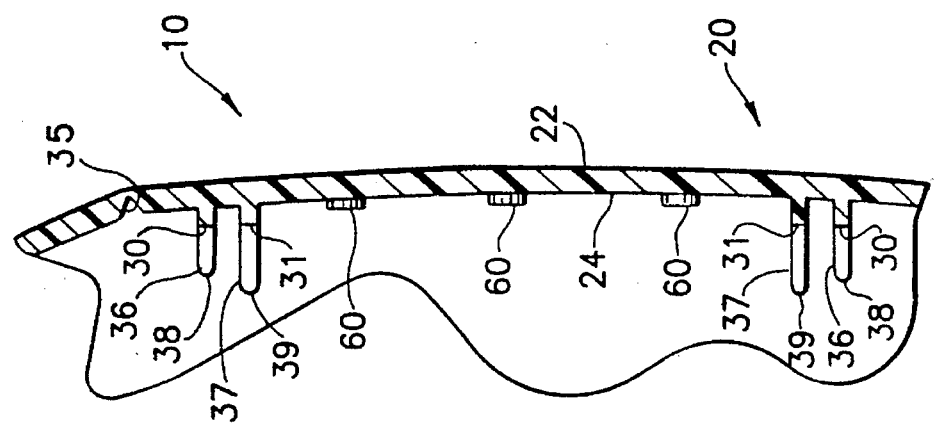
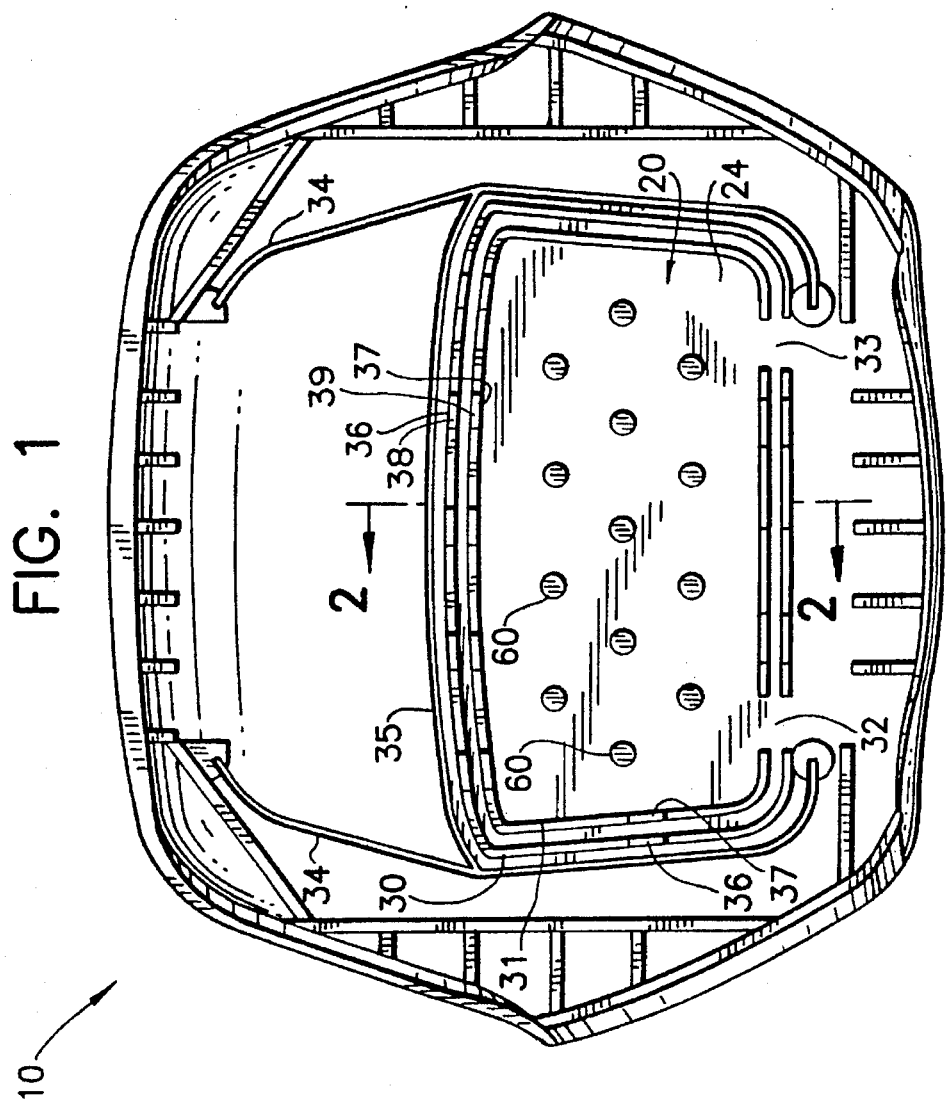

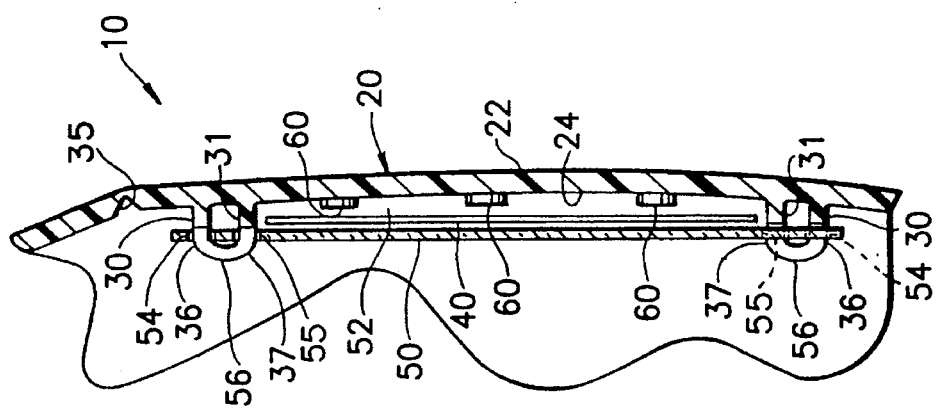
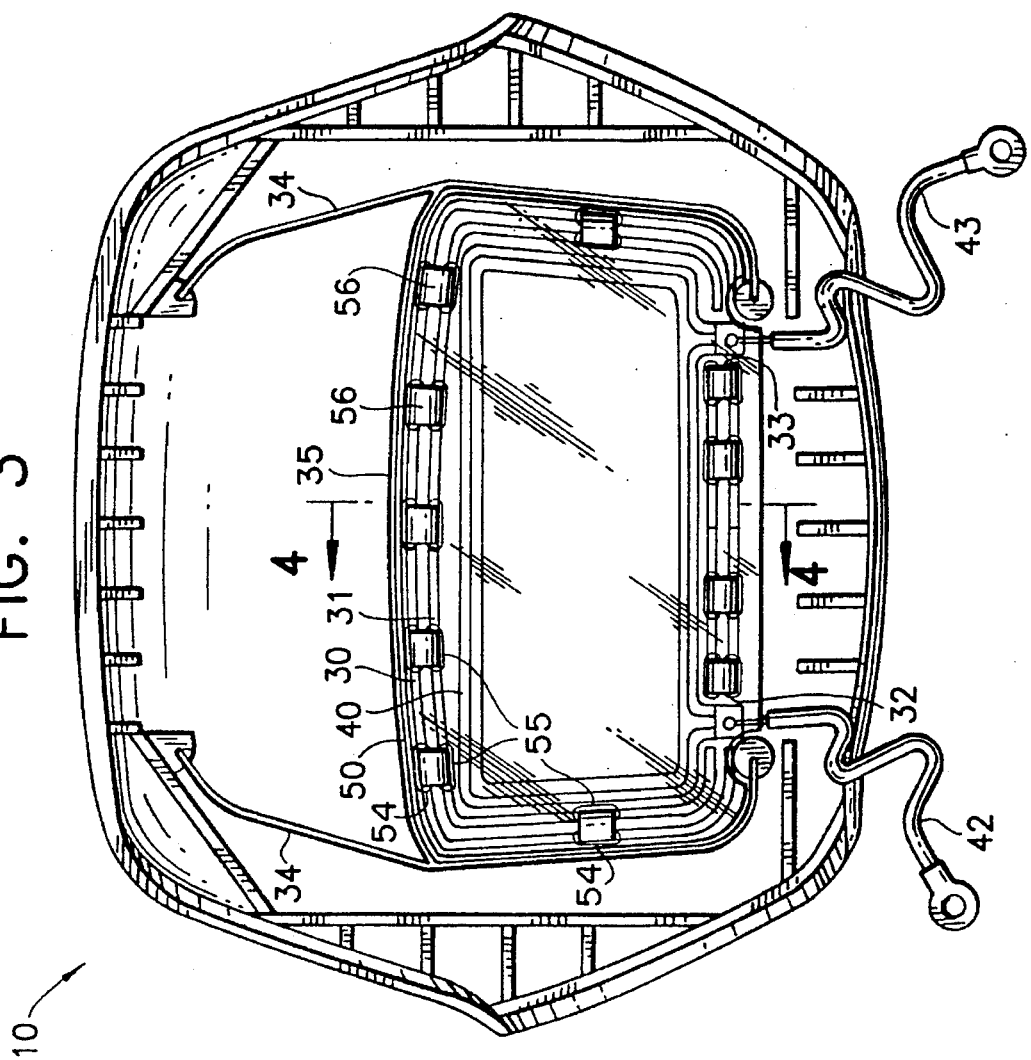

AIRBAG MODULE COVER WITH FLOATING HORN SWITCH

FIELD OF THE INVENTION

The present invention relates to an airbag module cover having a horn switch. More particularly, the present invention relates to an airbag module cover having a floating membrane horn switch freely retained within a positive gap formed between the airbag module cover and a horn switch backing plate attached thereto.

BACKGROUND OF THE INVENTION

Driver side airbag modules, which include an airbag cushion and an airbag module cover, are normally positioned within a hub of a steering wheel of an automobile. This happens to be the same area which conventionally includes the horn switch. Accordingly, the airbag module cover must additionally serve to actuate the horn switch, preferably over a substantial area.

A number of horn switch designs have included a membrane type switch. Membrane type switches conventionally comprise two very thin sheets having conductive coatings which are normally separated by thin spacers. Pressure on the switch pushes the conductive surfaces together to close a circuit and actuate the horn. Pressure is applied to the horn switch by the airbag module cover in the hub of the steering wheel, which is depressed by the driver.

The introduction of the airbag module at the steering wheel hub complicated the design of the horn switch and the airbag module cover. For example, the cover should not require an unreasonable degree of depression or an unreasonable amount of applied pressure to actuate the horn switch, the horn switch should not be susceptible to inadvertent actuation, and the horn switch must not become unattached from the airbag module cover upon inflation of the airbag.

In addition, the airbag modules including the membrane horn switch are required to pass certain tests after and during which the module is subjected to environmental conditioning. This conditioning includes subjecting the module to thermal, humidity and vibration cycling that in most cases exceeds the average operational life of an automobile. For example, the temperature and humidity may range from 90° C. and 95% relative humidity to −40° C. These extreme conditions also make the design of a membrane horn switch very difficult.

In some earlier prior art membrane horn switch and airbag module cover configurations, the switch was compressed against the folded airbag cushion itself located behind the airbag module cover. These configurations required a large degree of airbag module cover depression and a large amount of force to activate the switch.

Some later prior art membrane horn switch and airbag module cover configurations tried to overcome these problems by securing the switch directly to the airbag module cover or tightly sandwiching the switch between the cover and an attached switch backing plate. Yet, these combinations made the switches susceptible to inadvertent actuation due to thermal contraction or expansion of the airbag module cover at extreme temperatures. The amount of pressure required to activate the horn switch also varied substantially as a function of ambient temperature, which affects the flexibility of the cover and backing plate. Some prior art membrane switches also included localized raised areas located on the front of the switches. The raised areas faced the module cover and acted as force concentrators that decreased the amount of applied force needed to actuate the switch.

In summary, it would be useful to provide an airbag module cover having a horn switch that does not require an unreasonable degree of cover depression or an unreasonable amount of applied pressure for actuation, and is not susceptible to inadvertent actuation resulting from thermal expansion or contraction of the cover.

SUMMARY OF THE INVENTION

An object, therefore, of the present invention is to provide an airbag module cover having a membrane horn switch mounted so that the cover requires only a reasonable degree of depression to actuate the horn switch.

Another object of the present invention is to provide an airbag module cover having a horn switch activated by a reasonable amount of driver applied force over a wide range of temperatures.

An additional object of the present invention is to provide an airbag module cover having a horn switch that is not susceptible to inadvertent actuation due to thermal expansion or contraction of the airbag module cover at extreme temperatures.

A further object of the present invention is to provide an airbag module cover having a horn switch that requires a consistent amount of pressure for actuation that does not vary substantially with ambient temperature.

In carrying out this invention, there is provided an airbag module cover with a membrane horn switch for operation by a vehicle driver. The airbag module cover has a switch cover panel having a front outer face and a rear inner face, with the front outer face forming a portion of the airbag module cover presented to the driver. Spacing means extend rearwardly from and surround the rear inner face, which is deformably depressible from the front outer surface.

A membrane horn switch is received within the spacing means adjacent the rear inner face. A relatively rigid switch backing plate is supported by the spacing means and extends over the rear inner face, retaining the horn switch therebetween. The horn switch is operable by deformably depressing the front outer face to compress the membrane horn switch between the rear inner cover and the switch backing plate. Because the horn switch is mounted on the airbag module cover as opposed to the airbag cushion located behind the airbag module cover, the horn switch is independent of the cushion pack and does not need an unreasonable amount of cover depression to be actuated.

The spacing means creates a positive gap between the backing plate and the rear inner face so that the switch is not compressed between the rear inner face and the backing plate. Because the switch is in a positive gap, it is not affected by the thermal expansions and contractions of the cover and backing plate, and therefore is not susceptible to inadvertent actuation. In addition, the pressure needed to actuate the switch remains consistent and is not affected by ambient temperature which can affect the flexibility of the cover and backing plate.

According to one aspect of the invention, the horn switch is not attached to either the rear face or the backing plate, and floats freely therebetween.

According to another aspect of the invention, the airbag module cover also includes a plurality of raised force concentrators extending rearwardly from the rear inner face.

The force concentrators translate a distributed load applied to the front face of the cover into one or more point loads applied to the membrane horn switch. The force concentrators, therefore, in combination with the switch backing plate, reduce the amount of pressure that must be applied by the driver to actuate the horn switch.

According to additional aspects of the invention, means for securing the switch backing plate to the spacing means are also provided so that the switch and backing plate remain secured to the cover during inflation of the airbag.

The invention together with further objects, features, advantages and aspects thereof, will be more clearly understood from the following description taken in connection with the accompanying drawings.

BRIEF DESCRIPTION OF THE DRAWINGS

FIG. 1 is a rear elevation view of an airbag module cover of the present invention;

FIG. 2 is an enlarged cross-sectional view of the airbag module cover of FIG. 1, partially cut away and taken along line 2—2 of FIG. 1;

FIG. 3 is a rear elevation view of the airbag module cover of FIG. 1 and including a membrane horn switch and switch backing plate of the present invention; and FIG. 4 is an enlarged cross-sectional view of the airbag module cover of FIG. 3, partially cut away and taken along line 4—4 of FIG. 3.

The same reference numerals refer to the same elements throughout the various figures.

DETAILED DESCRIPTION OF THE INVENTION

The present invention is directed to an airbag module cover having a floating membrane horn switch. An airbag module cover is part of an airbag module which also includes an airbag cushion. How an airbag module cover is mounted within a steering wheel of an automobile and how a membrane horn switch works are both known in the art and, accordingly, are not described in detail as they do not in themselves constitute features of the present system. Only the components of an airbag module cover according to the present invention, including the cover, spacing means, membrane horn switch, switch backing plate and securing means, as they relate to the instant invention, will be described in detail.

Referring first to FIGS. 1 and 2, there is shown an airbag module cover of the present invention, generally represented by the reference numeral 10. The airbag module cover 10 is typically thermoplastic and includes a switch cover panel 20 comprising a portion of the cover within a hub of the steering wheel (not shown) surrounded by airbag tearstrips 34,35 as further described below. The switch cover panel has a front outer face 22 and a rear inner face 24. The outer face 22 forms a portion of the airbag module cover presented to the driver and the rear inner face 24 is deformably depressible by pressure applied to the front outer face 22.

Spacing means comprising a pair of spaced-apart raised ridges 30,31 extends rearwardly from and surrounds the rear inner face 24 in a substantially continuous manner except for a pair of access gaps 32,33 formed through the ridges 30,31. Additionally, it is not beyond the scope of this invention for the spacing means to comprise a substantially continuous single ridge or even a non-continuous ridge. The ridges 30,31 include a plurality of spaced pairs of stakes 36,37 that are integral with and have distal ends 38,39 extending rearwardly from the pair of raised ridges 30,31, respectively. The stakes 36,37 are arranged in a predetermined pattern about the ridges 30,31.

Referring now to FIGS. 3 and 4, the airbag module cover 10 of FIGS. 1 and 2 mounts a membrane horn switch 40 and switch backing plate 50. The membrane horn switch 40 is generally rectangular and is received within the ridges 30,31 adjacent the rear inner face 24, and has a pair of leads 42,43 attached thereto. The horn switch could be some other geometry to be compatible with the cover styling, such as square or circular for example. The leads 42,43 extend respectively through the pair of access gaps 32,33 in the ridges 30,31 and are connectable to a remote electrical power supply and horn circuitry.

The switch backing plate 50 is also generally rectangular and is supported by the ridges 30,31 to extend over the rear inner face 24 and retain the horn switch 40 therebetween. The switch backing plate 50 has a plurality of spaced pairs of openings 54,55 therethrough arranged in the same predetermined pattern as the plurality of spaced pairs of stakes 36,37. As shown, the stakes 36,37 extend through the openings 54,55 with the distal ends 38,39 of each pair of stakes 36,37 bent over and joined to form a bridge 56, thereby securing the switch backing plate 50 to the ridges 30,31. These ensure that the horn switch 40 and the switch backing plate 60 will stay secured to the cover 10 upon inflation of the airbag cushion. The distal ends 38,39 of the stakes 36,37 may be bent over and joined by heating, ultrasonic welding or other satisfactory thermoplastic welding means.

As shown, the ridges 30,31 create a positive gap 52 between the backing plate 50 and the rear inner face 24 so that the switch 40 floats freely therein and is not compressed or sandwiched between the rear inner face 24 and the backing plate 50 until actuated by the driver. Not sandwiched means that the horn switch 40 is not simultaneously in contact with and biased together by the cover 20 and the backing plate 50 absent compressive force applied to the cover. The horn switch 40 may be attached to the cover 20 or the backing plate 50 or simultaneously in contact with both as long as there is enough room to allow the cover 20 and backing plate 50 to expand or contract without actuating the horn switch 40. The horn switch 40 may be operated by deformably depressing the switch cover panel 20 from the front outer cover 22 to compress the membrane horn switch 40 between the rear inner cover 24 and the switch backing plate 50.

Because the switch 40 is not sandwiched therebetween, it will not be affected by the thermal expansions and contractions of the cover 10 and backing plate 50, and therefore will not be susceptible to inadvertent actuation. Also, the pressure needed to actuate the switch 40 remains substantially consistent and is not affected by ambient temperature which can affect the flexibility of the cover 10 and backing plate 50. In addition, because the horn switch 40 is mounted on the airbag module cover 10 as opposed to the airbag cushion (not shown) of the airbag module, as in some prior art cover switch combinations, the horn switch 40 does not require a significant amount of cover depression to be actuated.

Referring to FIGS. 1, 2 and 3, a plurality of spaced-apart raised force concentrators comprising a plurality of generally cylindrical studs 60 extend rearwardly from the rear inner face 24. The geometry of the studs 60 can be other than cylindrical, such as spherical or a cross pattern for example. In general, the studs 60 are small raised areas which will create substantially a point load. The plurality of cylindrical studs 60 are arranged in a horizontal top and bottom row of four equally spaced studs and a horizontal middle row of five equally spaced studs offset from the first and second rows. The force concentrators translate a distributed load applied to the front face 22 of the switch cover panel 20 into one or more point loads on the membrane horn switch 40. The force concentrators, therefore, in combination with the relatively rigid switch backing plate 50, reduce the amount of pressure that must be applied to the front outer cover 22 of the switch cover panel 20 by the driver to actuate the horn switch 40. The ridges 30,31 and the force concentrators 60 are sized such that even with the force concentrators 60, the positive gap 52 remains between the force concentrators and the backing plate 50.

As seen in FIGS. 1 through 4, the airbag module cover 10 further includes a pair of vertical airbag tear strips 34 formed in the cover 10 on either side of the ridges 30,31 and the rear inner face 24, and a horizontal airbag tear strip 35 formed in the cover 10 above the ridges 30,31 and the rear inner face 24 and extending between the vertical tear strips 34. The tear strips 34,35 provide weak points in the cover 10 where an inflating airbag cushion can break through for deployment, with the horn switch 40 securely retained on the switch cover panel 20.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag module cover with a membrane horn switch for operation by a vehicle driver, comprising:

a switch cover panel having a front outer face and a rear inner face, the outer face forming a portion of the airbag module cover presented to the driver, the switch cover panel deformably depressible from the front outer surface;

the membrane horn switch for closing a horn switch circuit upon being compressed, the membrane horn switch positioned adjacent the rear inner face of the switch cover panel;

spacing means extending rearwardly from the rear inner face of the switch cover panel and extending beyond the position of the membrane horn switch, the spacing means located peripherally around the membrane horn switch; and a secured switch backing place supported by the spacing means and retaining the horn switch between the rear inner face and the backing plate;

the spacing means creating a positive gap between the backing plate and the rear inner face greater than a thickness of the membrane horn switch so that the membrane horn switch is not simultaneously in contact with and compressed between the backing plate and the rear inner face absent compressive force applied to the cover by a vehicle driver.

2. The airbag module cover of claim 1 wherein the horn switch floats freely between the rear inner face and the switch backing plate and is not attached to either the rear inner face or the backing plate.

3. The airbag module cover of claim 2 further comprising a plurality of spaced-apart raised force concentrators extending rearwardly from the rear inner face of the switch cover panel, whereby the force concentrators translate a distributed load applied to the front outer face of the switch cover panel into at least one point load on the membrane horn switch.

4. The airbag module cover of claim 3 wherein the force concentrators comprise generally cylindrical studs formed on the rear inner face.

5. The airbag module cover of claim 4 wherein the cover is made of thermoplastic and includes a plurality of airbag tear strips surrounding the spacing means and switch cover panel.

6. The airbag module cover of claim 2 wherein the spacing means surrounds the rear inner face in a substantially continuous manner.

7. The airbag module cover of claim 6 wherein the spacing means comprises a pair of spaced-apart raised ridges.

8. The airbag module cover of claim 7 further comprising means securing the switch backing plate to the spaced-apart raised ridges.

9. The airbag module cover of claim 8 wherein means securing the switch backing plate comprises a plurality of spaced pairs of stakes integral with and respectively extending rearwardly from the pair of raised ridges, the stakes arranged in a predetermined pattern; and the switch backing plate having a plurality of spaced pairs of openings therethrough arranged in the same predetermined pattern as the plurality of spaced pairs of stakes, the stakes extending through the openings with the distal ends of each pair of stakes joined to form a bridge, thereby securing the backing plate to the switch cover panel.

10. The airbag module cover of claim 1 further comprising a plurality of spaced-apart raised force concentrators extending rearwardly from the rear inner face of the switch cover panel, whereby the force concentrators translate a distributed load applied to the front outer face of the switch cover panel into at least one point load on the membrane horn switch.

11. The airbag module cover of claim 10 wherein the force concentrators comprise generally cylindrical studs formed on the rear inner face.

12. The airbag module cover of claim 11 wherein the cover is a thermoplastic and includes a plurality of airbag tear strips surrounding the spacing means and switch cover panel.

13. The airbag module cover of claim 1 wherein the spacing means surrounds the rear inner face in a substantially continuous manner.

14. The airbag module cover of claim 13 wherein the spacing means comprises a pair of spaced-apart raised ridges.

15. The airbag module cover of claim 14 further comprising means securing the switch backing plate to the spacing means.

16. The airbag module cover of claim 15 wherein means securing the backing plate comprises a plurality of spaced pairs of stakes integral with and respectively extending rearwardly from the pair of raised ridges, the stakes arranged in a predetermined pattern; and the switch backing plate having a plurality of spaced pairs of openings therethrough arranged in the same predetermined pattern as the plurality of spaced pairs of stakes, the stakes extending through the openings with the distal ends of each pair of stakes joined to form a bridge, thereby securing the backing plate to the switch cover panel.

17. An airbag module cover with a membrane horn switch for operation by a vehicle driver, comprising:

a switch cover panel having a front outer face and a rear inner face, the outer face forming a portion of the airbag module cover presented to the driver, the switch cover panel deformably depressible from the front outer surface;

the membrane horn switch for closing a horn switch circuit upon being compressed, the membrane horn switch positioned adjacent the rear inner face of the switch cover panel;

spacing means extending rearwardly from the rear inner face of the switch cover panel and extending beyond the position of the membrane horn switch, the spacing means located peripherally around the membrane horn switch; and a secured switch backing plate supported by the spacing means and retaining the horn switch between the rear inner face and the backing plate;

the spacing means creating a positive gap between the backing plate and the rear inner face greater than a thickness of the membrane horn switch so that the membrane horn switch is not simultaneously in contact with and compressed between the backing plate and the rear inner face absent compressive force applied to the cover by a vehicle driver; and a plurality of spaced-apart raised force concentrators extending rearwardly from the rear inner face of the switch cover panel, whereby the force concentrators translate a distributed load applied to the front outer face of the switch cover panel into at least one point load on the membrane horn switch.

18. The airbag module cover of claim 17 wherein the force concentrators comprise generally cylindrical studs formed on the rear inner face.

19. The airbag module cover of claim 18 wherein the cover is a thermoplastic and includes a plurality of airbag tear strips surrounding the spacing means and switch cover panel.

20. An airbag module cover with a membrane horn switch for operation by a vehicle driver, comprising:

a generally rectangular switch cover panel having a front outer face and a rear inner face, the outer face forming a portion of the airbag module cover presented to the driver, the switch cover panel deformably depressible from the front outer face;

the membrane horn switch for closing a horn switch circuit upon being compressed, the membrane horn switch being generally rectangular and positioned adjacent to and substantially covering the rear inner face of the switch cover panel;

a pair of spaced-apart raised ridges extending rearwardly from the rear inner face of the switch cover panel and extending beyond the position of the membrane horn switch, the spaced apart raised ridges located peripherally around the membrane horn switch in a substantially continuous manner;

a pair of access gaps formed through the ridges with a pair of leads of membrane horn switch extending out from within the raised ridges through the pair of access gaps in the ridges;

at least one tear strip formed in the cover;

a plurality of spaced pairs of stakes integral with and respectively extending rearwardly from the pair of raised ridges, the stakes arranged in a predetermined pattern;

a generally rectangular switch backing plate supported by the ridges retaining the horn switch between the rear inner face and the backing plate;

the raised ridges creating a positive gap between the backing plate and the rear inner face greater than a thickness of the membrane horn switch so that the membrane horn switch as not simultaneously in contact with and compressed between the backing plate and the rear inner face absent compressive force applied to the cover by a vehicle driver, the membrane horn switch being unattached to either the rear inner face or the backing plate, the switch backing plate having a plurality of spaced pairs of openings therethrough arranged in the same predetermined pattern as the plurality of spaced pairs of stakes, the stakes extending through the openings with the distal ends of each pair of stakes joined to form a bridge, thereby securing the switch backing plate to the ridges; and a plurality of generally cylindrical studs extending rearwardly from the rear inner face, whereby the cylindrical studs translate a distributed load applied to the front face of the cover into at least one point load on the membrane horn switch.

* * * * *